UNITED STATES PATENT OFFICE.

LEONARD SCHADE VAN WESTRUM, OF GRAND RAPIDS, MICHIGAN.

METHOD OF MAKING ROADS.

956,009. Specification of Letters Patent. Patented Apr. 26, 1910.

No Drawing. Application filed April 13, 1909. Serial No. 489,662. REISSUED

*To all whom it may concern:*

Be it known that I, LEONARD SCHADE VAN WESTRUM, a subject of the Queen of the Netherlands, residing at Grand Rapids, Michigan, have invented new and useful Improvements in Methods of Making Roads, of which the following is a specification.

My invention relates to improvements in methods of making roads, streets, public squares, road-beds of railways and other like surfaces, by means of an asphaltic cement laid cold.

All bituminous roads, streets, etc., like sheet asphalt, tar, macadam, bitulithic asphalt macadam, have hitherto been built in the following manner: The sand, stone, etc., have to be heated and also the bitumen, like asphalt, tar, etc., and these materials have to be mixed hot and spread hot over a given foundation. The object of heating the materials, is to drive out all of the moisture which the mineral aggregate contains, because this moisture would prevent the bitumen, asphalt, tar, etc., from entering the pores of the mineral aggregate and no permanent binding effect would be possible.

My invention does away with heating in any form when the pavement is to be laid. I use the moisture in the stones, sand, gravel, earth, etc., as carrying agents, which suck the bituminous material, like asphalt, tar, etc., into the pores of the mineral aggregate. For this purpose I liquefy hard bitumen, like natural asphalt, artificial asphalt, or the like, by heating the same and mixing it with any suitable flux, like residuum of mineral oils, or residuum of cotton seed or similar oils. In case I use a softer bitumen, like Texas, California or Kansas asphalt, which contains enough natural flux, I use these asphaltums pure, or with a smaller percentage of flux and I make these mixtures emulsifiable in water. The products obtained are mixed with cold stone, sand, or earth, by hand or machinery, and spread upon the roadway on a given foundation, and then compacted. The moisture in the stone will suck the emulsified asphalt cement into the pores of the stone and after a few hours the action of the air oxidizes the emulsified asphaltic cement and the whole mixture of stone, etc., and emulsified asphaltic cement makes a compact mass which is hard enough to withstand any kind of traffic and still be elastic.

By "hard bitumen" I mean asphaltums, tar, etc., which are not fluid when cold.

In order to emulsify the asphalt, tar, etc., I heat the same until they are liquid, with or without addition of a suitable flux, saponify them through acid, alkali, ricinus oil, resin oil, resin, alkaloid, chinolin, pyridin or picolin base and a volatile fluid like ammonia, etc., and add so much water to the mixture that it stays fluid when cold.

In order to be suitable for road building purposes the emulsified cement must not contain more than 10 to 20 parts chemicals, acids, resin, ammonia, etc., and the proportion of asphalt, tar, etc., must be not less than 30 parts and not more than 80 parts of the whole mixture. I take for example 60 to 80 parts of Trinidad or Bermudas asphalt, mix this with 20 to 40 parts suitable flux, emulsify this mixture by adding to the hot mixture 4 parts to 8 parts of resin, three to six parts of resin oil, 2 to 4 parts red oil, and 2 to 4 parts ammonia, and 20 to 40 parts water. These materials must be thoroughly mixed so they will readily emulsify in water.

I do not limit my invention to any special process of emulsifying the bitumen, but what I claim as new is that I use as the base of my asphaltic cement hard bitumen which is not fluid when cold, in excess over fluxes and chemicals.

It is well known that emulsions of oily substances are used for dust laying purposes and it is also known through my United States Letters Patent No. 752,486 dated Feb. 16, 1904, that mixtures of emulsified or soluble oily substances are used as binding agents for broken stone, gravel, etc., which has proven successful for dust laying purposes, but as a method of constructing a permanent pavement it has this disadvantage, that the oily substance even with the addition of an amount of liquid asphalt does not oxidize through action of the air and does not dry quickly enough to be rolled or tamped properly.

Having thus described my invention, what I claim is:

The method of building roads, which consists in mixing an asphaltic cement emulsified with an agent whose basis is water, with broken stones, gravel, earth, etc., in their natural condition, and spreading and compacting the mixture on a suitable foundation, substantially as described.

In witness whereof, I have hereunto signed my name this 10th day of April, 1909, in the presence of two subscribing witnesses.

LEONARD SCHADE VAN WESTRUM.

Witnesses:
GERARD SCHADE VAN WESTRUM,
BESSIE NEIKIRK.